United States Patent [19]

Masunaga

[11] Patent Number: 5,585,870
[45] Date of Patent: Dec. 17, 1996

[54] RIMLESS SPECTACLES WITH ITS LENSES SUPPORTED AND CLIPPED AT THREE POINTS

[75] Inventor: Satoru Masunaga, Fukui, Japan

[73] Assignee: Masunaga Optical Mfg. Co., Ltd., Fukui, Japan

[21] Appl. No.: 392,985

[22] PCT Filed: Dec. 20, 1994

[86] PCT No.: PCT/JP94/02148

§ 371 Date: Mar. 6, 1995

§ 102(e) Date: Mar. 6, 1995

[87] PCT Pub. No.: WO96/05535

PCT Pub. Date: Feb. 22, 1996

[30] Foreign Application Priority Data

Dec. 8, 1994 [JP] Japan .................................. 6-010006

[51] Int. Cl.$^6$ .............................. G02C 1/04; G02C 1/02; G02C 5/14
[52] U.S. Cl. ............................ 351/106; 351/110; 351/116
[58] Field of Search ........................... 351/110, 41, 158, 351/153, 116, 111, 121, 140, 103, 106; 16/228

[56] References Cited

U.S. PATENT DOCUMENTS 5,073,020  12/1991  Lindberg .................................. 351/106
5,135,296   8/1992  Lindberg .................................. 449/86
5,471,257  11/1995  Houmand ................................. 351/110

Primary Examiner—Hung Dang
Attorney, Agent, or Firm—Ronald R. Snider

[57] ABSTRACT

The technical issues of the present invention are to provide a pair of the rimless spectacles whose right-and-left lenses can be mechanically simply interlocked and held in a stable condition by means of three points supporting system with simple metallic holding parts and also which is easy to correct an error of locking holes bored in the lenses, and if necessary, further to provide a pair of the rimless spectacles which is fittable to those eyeglasses wearers whose right-and-left eyes are narrow in distance and whose face is wide in breadth and which is also adequate for P.D. (pupil distance) standard. To solve those issues, the present invention has adopted such technical means as the bridge made of metallic material constituted by having two bars of the inner rim pad portion running in parallel capable of making a line contact with the inner edge portion of the right-and-left lenses and the inner going-through portion to be poked through the bridge locking hole bored in the lenses nearer to the inner edge portion thereof as well as the bracket endpiece made of metallic material constituted by having two bars of the outer rim pad portion running in parallel capable of making a line contact with the outer edge portion of said lenses and the outer going-through portion to be poked through the endpiece locking hole bored in the lenses nearer to the outer edge portion thereof, and it is characterized in that a pair of the right-and-left lenses are symmetrically juxtaposed by interposing and interlocking them by means of such three points supporting system as mentioned above.

3 Claims, 2 Drawing Sheets

RIMLESS SPECTACLES WITH ITS LENSES SUPPORTED AND CLIPPED AT THREE POINTS

FIELD OF THE INVENTION

The present invention relates to the improvement in a pair of rimless spectacles, more specifically, a pair of rimless spectacles with its lenses supported and clipped at three points which is not only surprisingly easy and fast to assemble but also very stable in holding the lenses thereof, and especially it is very beneficial to the optical shop and the eyeglasses discount shop owners who must actually process and assemble the lenses by themselves according to demand from an individual purchaser of spectacles.

BACKGROUND OF THE INVENTION

The taste of recent eyeglasses wearers is focused on a pair of rimless spectacles which not only weighs light and has a wide and bright view but also is so shapely and casual that it may be used as a fashionable goods.

However, the problem with such a pair of rimless spectacles as mentioned above in which the recent tendency to less weight, wider view and better shapeliness does damage on the durability, fastness and stability in holding the lenses thereof, with the result that there arises contradictory proposition therebetween, has been already pointed out in the specification titled "Spectacles Lenses Locking Mechanism" of the Japanese Utility Model Registration No. 3005441 which the present applicant has been granted by the Japanese Patent Office.

The object of the present invention is intended to solve the aforesaid contradictory proposition arisen in the conventional rimless spectacles as disclosed in "Spectacles Lenses Locking Mechanism" of the Japanese Utility Model Registration No. 3005441 in a different technical means and to provide a practical pair of rimless spectacles which can not only stably hold right-and-left lenses with holding parts capable of being manufactured basically in an integral molding but also be easy and fast to assemble practically without need to use any special skill.

Another object of the present invention is to provide a pair of rimless spectacles of which lenses can be stably supported and elastically clipped at three points, in other words, one locking hole and two edge portions of the lens without either cutting a slot on edge portions thereof or installing a receiving metallic piece to hold edge portions thereof on the lenses supporting portion of a bridge and a bracket endpiece.

The further object of the present invention is to provide a pair of rimless spectacles which is easy to assemble in view of correction process where assuming that there is something wrong with the making position of either the bridge locking hole or endpiece locking hole to be opened in the lenses, it can be assembled in an acceptable form without any difficulty only by a little adjusting the interval in a parallel relation between a rim pad portion of the bridge or bracket endpiece and a free end portion thereof.

BEST MODE FOR CARRYING OUT THE INVENTION

Figure 1:
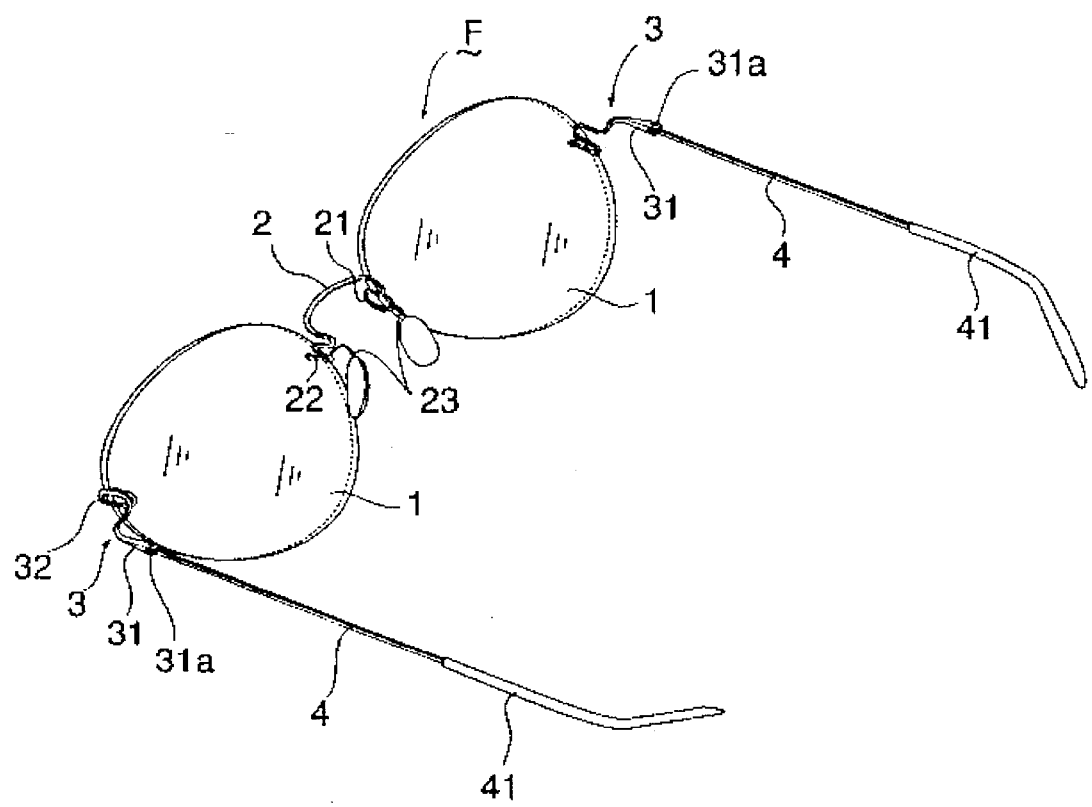
FIG. 1 is a perspective view to show an example (a pair of rimless spectacles with its lenses supported and clipped at three points) embodied in and produced through the application of the present invention.

The technical means for the present inventor to have adopted for solving the aforesaid technical issues will be described as follows in reference to the accompanying drawings.

Namely, the present invention has overcome the above-mentioned technical issues through the completion of rimless spectacles with its lenses supported and clipped at three points, on the technical background that conventionally well-known rimless spectacles a pair of right-and-left lenses (1) of which is symmetrically juxtaposed and connected through a bridge (2) in the proximity of the adjacently opposed inner edge portions of both lenses (1) and bracket endpieces (3) are mounted on the outer edge portions of both lenses (1) to form a front frame (F) and temples (4) are foldably connected to end portions (31a) of corbels (31) on both bracket endpieces (3), being capable of stably supporting and elastically clipping the lenses (1) at three points, namely, one locking hole and two edge portions thereof by adopting such technical means as boring each bridge locking hole (11) in the aforesaid right-and-left lenses (1) nearer to the inner edge portions thereof and also each endpiece locking hole (12) in said lenses (1) nearer to the outer edge portions thereof, and making the bridge (2) with metallic material and protrusively forming at both ends of said bridge (2) two bars of the inner rim pad portion (21) running in parallel with a required interval, capable of making a line contact with the inner edge portions of the lenses (1) and inner going-through portions (22) further extending from said rim pad portions (21) with a required interval therebetween and elastically securing said portions (22) to each bridge locking hole (11) in the right-and-left lenses (1) with the portions (22) inserted through the locking holes (11), and furthermore making the bracket endpieces (3) formed on the outer edge portions of the aforesaid right-and-left lenses (1) also with metallic material and protrusively forming at the bracket endpieces (3) two bars of outer rim pad portion (32) running in parallel with a required interval, capable of making a line contact with the outer edge portions of the lenses (1) and outer going-through portions (33) further extending from said rim pad portions (32) with a required interval therebetween and elastically securing said portions (33) to each endpiece locking hole (12) in the right-and-left lenses (1) with the portions (33) inserted through the locking holes (12).

Hereinafter, the present invention will be described more in detail on the basis of embodiment shown in the accompanying drawings.

Numeral (1) in the drawings indicates a pair of lenses symmetrically juxtaposed right and left and one bridge locking hole (11) is bored in said lenses nearer to the inner edge portion thereof where the bridge to be described later is locked while one endpiece locking hole (12) is bored in said lenses nearer to the outer edge portion thereof where the bracket endpiece to be described later is locked.

Numeral (2) therein indicates the bridge produced by performing plastic deformation (bending, pressing etc.) and heat treatment to metallic wire (made of nickel-chrome alloy in the present embodiment). The bridge (2) is integrally constituted by having at its both ends two bars of the inner rim pad portion (21) running in parallel with a required interval, capable of making a line contact with the inner edge portion of the above-mentioned lenses (1) and the inner going-through portion (22) further extending from this rim pad portion (21) and giving energization to the direction of the aforesaid rim pad portion (21), and this constitution provides mutually attracting elasticity and rigidity between said two bars of the rim pad portion (21) running parallelwise and said going-through portion (22). And now, numeral (23) is a pad arm soldered on one bar of the aforesaid rim pad portion (21) and at the end portion of which a nose pad (of which numeral is omitted) is fixed.

Numeral (3) therein indicates bracket endpieces produced by swaging and further bending the same metallic wire as that of the aforesaid bridge (2). This bracket endpiece (3) is integrally constituted by having the corbel (31) to be arranged at the ocular side of the spectacles and the end portion (31a) to be connected to the temple to be described later as well as two bars of the outer rim pad portion (32) running in parallel with a required interval, capable of making a line contact with the outer edge portion of the aforesaid lenses (1) and the outer going-through portion (33) further extending from the rim pad portion (32) and giving energization to the direction of the aforesaid rim pad portion (32), and this constitution provides mutually attracting elasticity and rigidity between two bars of the rim pad portion (32) running parallelwise and said going-through portion (33).

Additionally, the corbel (31) of the bracket endpiece (3) adopted in the present embodiment is crooked in a crank shape and the end portion (31a) of which is moved parallelwise to the outward direction so that the interval between the right-and-left temples to be hinged thereto may be widened. Accordingly, the rimless spectacles in the present embodiment is suitable for those eyeglasses wearers whose right-and-left eyes is narrow in distance and whose face is broad in width.

Numeral (4) is the temple produced by using a superelastic nickel-titanium alloy wire, and which is hinged to the end portion of the corbel (31) of the aforesaid bracket endpiece (3). The free end portion of this temple (4) is overcoated with an ear pad (41) or what is called an end cover, made of synthetic resin.

Numeral (5) is a slip-off prevention buffer sleeve made of synthetic resin (polycarbonate resin) to be intervened between the bridge locking holes (11) of the aforesaid lenses (1) and inner going-through portions (22) to be inserted through the bridge locking holes (11) as well as between the endpiece locking holes (12) of the aforesaid lenses (1) and outer going-through portions (33) to be inserted through the endpiece locking holes (12).

Figure 2:
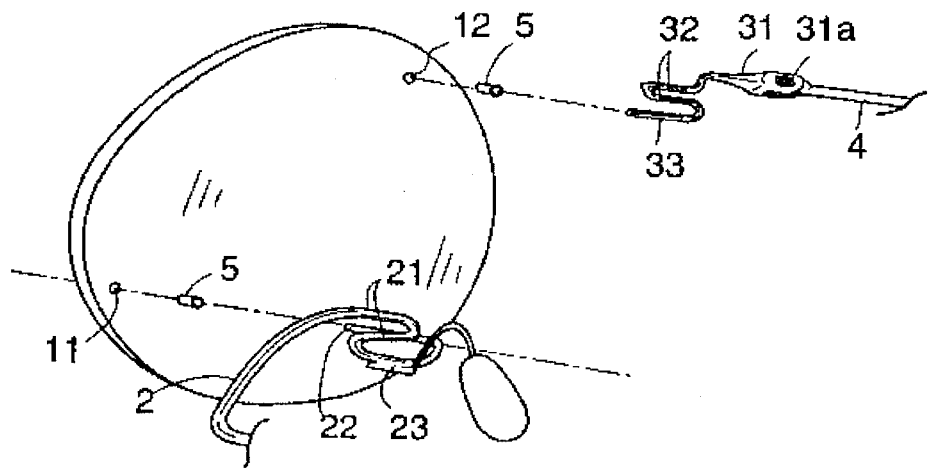
FIG. 2 is a partly enlarged and exploded perspective view to show the portions of the lens to which the bridge and the bracket endpiece are connected in the present embodiment.
Figure 3:
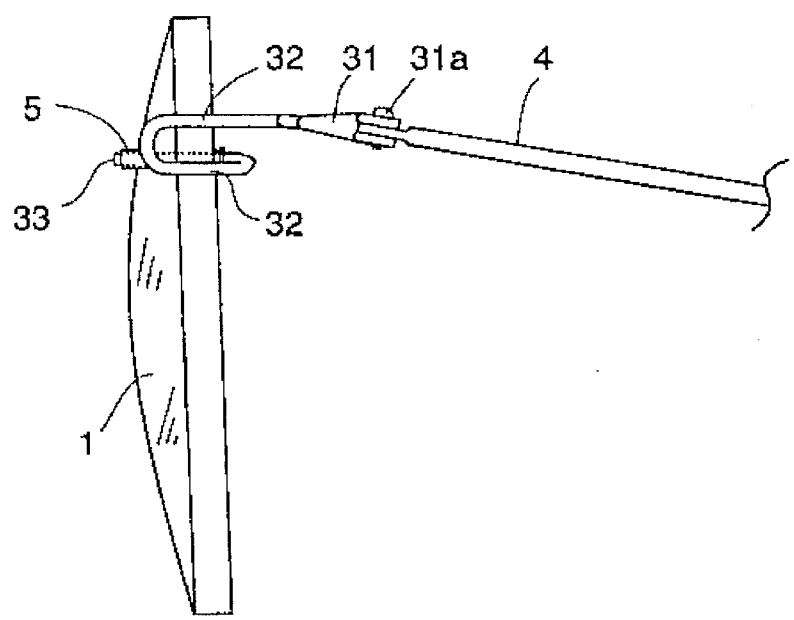
FIG. 3 is a side elevation to show the magnified portion of the lens to which the bracket endpiece is connected in the present embodiment.
Figure 4:
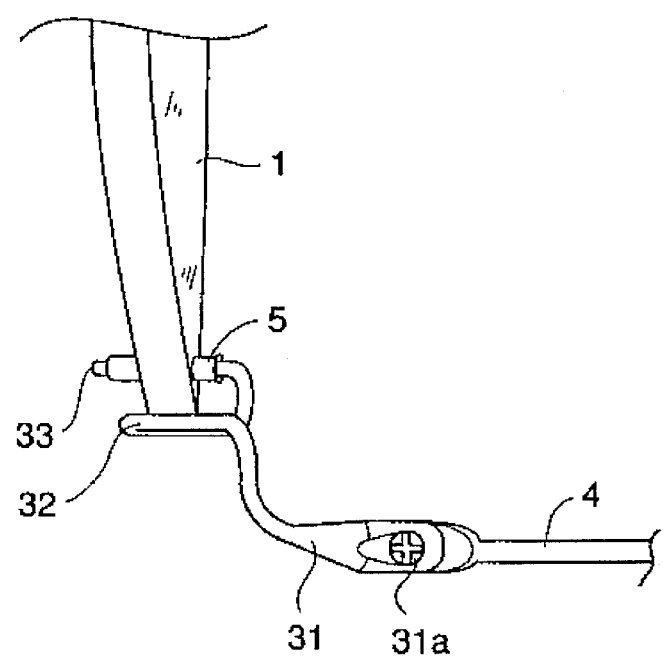
FIG. 4 is a plan view to show the magnified bracket endpiece in the present embodiment.

Then, with the rimless spectacles in the present embodiment, as shown in FIG. 2, since it causes two bars of the rim pad portion (21) running parallelwise and inner going-through portions (22) of the bridge (2) to have moderate rigidity and mutually attracting elasticity therebetween by inserting inner going-through portions (22) through the bridge locking holes (11) of the lenses (1) while linearly contacting two bars of the rim pad portion (21) formed on the bridge (2) with the inner edge portion of the right-and-left lenses (1), the bridge locking hole (11) and the inner edge portion of the lenses (1) are stably interposed by three points, namely, two bars of the rim pad portion and inner free end portion of the bridge (2) so that the lenses (1) may be symmetrically juxtaposed at both ends of the bridge (2). In this case, if inner going-through portion (22) is inserted through the bridge locking hole (11) of the lenses (1) with the buffer sleeve (5) fitted on the portion (22) beforehand, it not only prevents the lenses (1) from becoming shaky but also keeps them stably positioned owing to slip-off prevention behavior caused by the frictional resistance of said sleeve (5).

On the other hand, as shown in FIG. 2, by inserting outer going-through portion (33) through the endpiece locking hole (12) of the lenses (1) while linearly contacting two bars of the rim pad portion (32) formed on the bracket endpiece (3) with the outer edge portion of the right-and-left lenses (1), because of mutually attracting elasticity between the rim pad portion (32) and outer going-through portion (33), the endpiece locking hole (12) and the outer edge portion of the lenses (1) are stably interposed by three points, namely, two bars of the rim pad portion and outer free end portion of the bracket endpiece (3) so that the right-and-left lenses (1), the bridge (2) and the bracket endpiece (3) may structure the front frame (F) and said bracket endpiece (3) may be correctly positioned at a predetermined place. And also in this case, in the same way as mentioned above as to inner going-through portion (22) of the bridge (2), if the portion (33) is inserted through the endpiece locking hole (12) of the lenses (1) with the buffer sleeve (5) mounted on the portion (33) beforehand, it not only prevents the lenses (1) from becoming shaky but also keeps them stably positioned owing to slip-off prevention behavior caused by the frictional resistance of said sleeve (5).

A pair of rimless spectacles with its lenses supported and clipped at three points in the present embodiment is completed by hinging the temples (4) to the end portions (31a) of the bracket endpieces (3) on the right-and-left sides of the front frame (F) assembled in this way and finishingly mounting the nose pad (no numbering) at the end portion of the pad arm (23).

While the preferred embodiment to be disclosed in this specification has been described above, it should be understood that the present invention is not limited to the above-mentioned example but can be modified in various ways within the scope of the accompanying patent claims. For instance, in the aforesaid example of the present invention, as lenses holding parts, the metallic wire is used which cause mutually attracting elasticity and moderate rigidity between the inner rim pad portion (21) and inner going-through portion (22) of the bridge (2) and between the outer rim pad portion (32) and outer going-through portion (33) of the bracket endpiece (3), but it is the correlation of the distance between the bridge locking hole (11) and the inner edge portion of the lens (1) with the interval between the rim pad portion (21) and inner going-through portion (22) of the bridge (2) or that of the distance between the endpiece locking portion (12) and the outer edge portion of the lens (1) with the interval between the rim pad portion (32) and outer going-through portion (33) that most count. It does not matter only if it is a metallic material with naturally equipped elasticity and moderate rigidity, and it is especially good if annealing treatment is not administered to it.

INDUSTRIAL APPLICABILITY

As having been described so far with the example of the preferred embodiment, since a pair of rimless spectacles embodied in the present invention adopts the lens interlocking method by means of three points supporting system by making a full use of the bridge locking hole and the endpiece locking hole respectively bored in the right-and-left lenses and skillfully harmonizing the elasticity and rigidity of the metallic material at the rim pad portion and going-through portion of both the bridge and the bracket endpiece, it dynamically constitutes a very stable interlocked structure at the bridge and the bracket endpiece respectively interposing between one locking hole and the edge portion of the lens without either cutting a slot on the edge portion of the lens or installing a receiving metallic piece to hold the edge portion thereof on the lens supporting portion of the bridge and the bracket endpiece as in the case of the conventional rimless spectacles so that it can be provided with fastness and durability equivalent to the conventional rimless spectacles.

Also, a pair of rimless spectacles in the present invention uses lens holding parts manufactured in an integral molding so that it can be assembled in such a very simple way that going-through portions of the holding parts are only poked through the holes of the lenses and the lenses are clipped by the other portions thereof, in other words, it can be easily and fast assembled without using any special skill or depending on an expert. In this case, if there is something wrong with the making position of the bridge locking hole or the endpiece locking hole to be opened in the lenses at the time of assembly process, a proper front frame can be assembled without any difficulty because a triangle formed by supporting the lenses with those three points can be transformed by revolving going-through portions of the bridge and the bracket endpiece so as to adjust a little parallelwise the interval between the rim pad portion and going-through portion thereof.

Additionally, with a pair of the rimless spectacles in the present invention, since the right-and-left lenses can be placed in a right position only by boring one bridge locking hole and one endpiece locking hole in each lens, it also makes it possible to freely design the lens according to the demand of the times without being bound by the lens holding mechanism.

Furthermore, with a pair of the rimless spectacles in the present invention, regarding the bracket endpiece to be arranged at the right-and-left sides of the front frame, if necessary, by adopting that of which corbel is crooked in a crank shape and widened by parallelwise moving it to the outward direction, it can well fit those eyeglasses wearers (like infants) whose right and left eyes are narrow in distance and whose face is relatively wide in breadth. Conventionally, since those eyeglasses wearers mentioned above have not been able to use a pair of rimless spectacles, they could not help choosing the spectacles of which frame is small in breadth. But in this case, the temple of which had to be forcedly transformed in order to coincide the optic axis of the right-and-left lenses with the visual axis of the right-and-left eyes (distance between pupils).

In this way, according to the present invention, its practical and economic merits are extremely high because it can not only overcome the obstacles conventionally encountered in this type of rimless spectacles but also make tile structure very simple and easy to assemble so that the cost of the parts may reduce.

What is claimed is:

1. Rimless spectacles with its lenses supported and clipped at three points, a pair of right-and-left lenses (1) of which is symmetrically juxtaposed and connected each other through a bridge (2) in the proximity of the adjacently opposed inner edge portions of both lenses (1) and bracket endpieces (3) are mounted on the outer edge portions of both lenses (1) to form a front frame (F) and temples (4) are foldably connected to end portions (31a) of corbels (31) on the bracket endpieces (3), in which each bridge locking hole (11) is bored in the aforesaid right-and-left lenses (1) nearer to the inner edge portions thereof and also each endpiece locking hole (12) is bored in said lenses (1) nearer to the outer edge portions thereof, and the bridge (2) is made of metallic material and two bars of inner rim pad portions (21) running in parallel with a required interval, capable of making a line contact with the inner edge portions of the lenses (1) and inner going-through portions (22) further extending from said rim pad portions (21) with a required interval therebetween are protrusively formed at both ends of said bridge (2) and said portions (22) are elastically secured to each bridge locking hole (11) in the right-and-left lenses (1) with the portions (22) inserted through the locking holes (11), and furthermore the bracket endpieces (3) formed on the outer edge portions of the aforesaid right-and-left lenses (1) are also made of metallic material and two bars of outer rim pad portions (32) running in parallel with a required interval, capable of making a line contact with the outer edge portions of the lenses (1) and outer going-through portions (33) further extending from said rim pad portions (32) with a required interval therebetween are protrusively formed at said bracket endpieces (3) and said portions (33) are elastically secured to each endpiece locking hole (12) in the right-and-left lenses (1) with the portions (33) inserted through the locking holes (12), and thus being capable of stably supporting and elastically clipping the lenses (1) at three points, namely, one locking hole and two edge portions thereof.

2. Rimless spectacles according to claim 1, in which a slip-off prevention buffer sleeve (5) made of synthetic resin is each intervened between the bridge locking hole (11) of the right-and-left lenses (1) and the inner going-through portion (22) to be inserted through the bridge locking hole (11) as well as between the endpiece locking hole (12) of said lenses (1) and the outer going-through portion (33) to be inserted through the endpiece locking hole (12).

3. Rimless spectacles according to claim 1 in which the corbel (31) of the bracket endpieces (3) at both outer edges of the front frame (F) is crooked in a crank shape and the end portion (31a) of the corbel is parallelwise moved to the outward direction so that the interval between the right-and-left temples (4) may be widened.

* * * * *